2,781,360

ORGANO-THIOMERCURI COMPOUNDS

Morton Kleiman, Chicago, Ill., assignor to Velsicol Chemical Corporation, a corporation of Illinois No Drawing. Application May 16, 1952, Serial No. 288,296

4 Claims. (Cl. 260—326)

This invention relates to the production of a new group of compositions of matter. More specifically, this invention relates to a class of compositions conforming with the following structural formula:

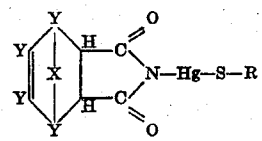

wherein R is the organic portion of an organo-thiomercuri compound; X is an oxygen atom, a methylene group or a dichloromethylene group; and Y is chlorine or hydrogen; and wherein when Y is chlorine, X is a dichloromethylene group and when Y is hydrogen X is oxygen or a methylene group.

To illustrate the nomenclature of this group of compositions, where R is an ethyl group and X is a dichloromethylene group and Y is chlorine, then the compound is termed N - (ethylthiomercuri) - 1,4,5,6,7,7 - hexachlorobicyclo-[2.2.1]-5-heptene-2,3-dicarboximide. If the ethyl group in this named compound were a phenyl group then the compound wiuld be termed N-(phenylthiomercuri)- 1,4,5,6,7,7-hexachlorobicyclo- [2.2.1]-5-heptene-2,3-dicarboximide; where R is any group other than ethyl or phenyl, then the name of such compound is as given above except that the name of the R group is substituted in place of the ethyl or phenyl.

Further illustrative of this group of compositions, where R is a propyl group and X is a methylene group and Y is hydrogen, then the compound is termed N-(propylthiomercuri)-bicyclo - [2.2.1] - 5-heptene-2,3 - dicarboximide. Where R is other than a propyl group then the nomenclature is modified only to the extent that the name for R is substituted for propyl.

Where R is an allyl group and X is an oxygen atom and Y is hydrogen then the compound is termed N-(allylthiomercuri)-7-oxabicyclo-[2.2.1]-5-heptene - 2,3 - dicarboximide. Where R is other than an allyl group then the nomenclature is modified only to the extent that the name for R is substituted for allyl.

Broadly, the products of this invention are prepared by reacting a five-membered cyclic diene of the group consisting of cyclopentadiene, hexachlorocyclopentadiene and furan with maleic anhydride to form the Diels-Alder adduct thereof, reacting said adduct with ammonia or an ammonia producing compound to form the imide of the aforesaid anhydride adduct; this imide or an N-metallo derivative thereof is then reacted with $$R-S-Hg-X$$

wherein R is a radical as previously defined and X is an anion such as chlorine, bromine, iodine, acetate, or nitrate, etc., to result in the desired product.

For clarity, the reactions involved are presented schematically below:

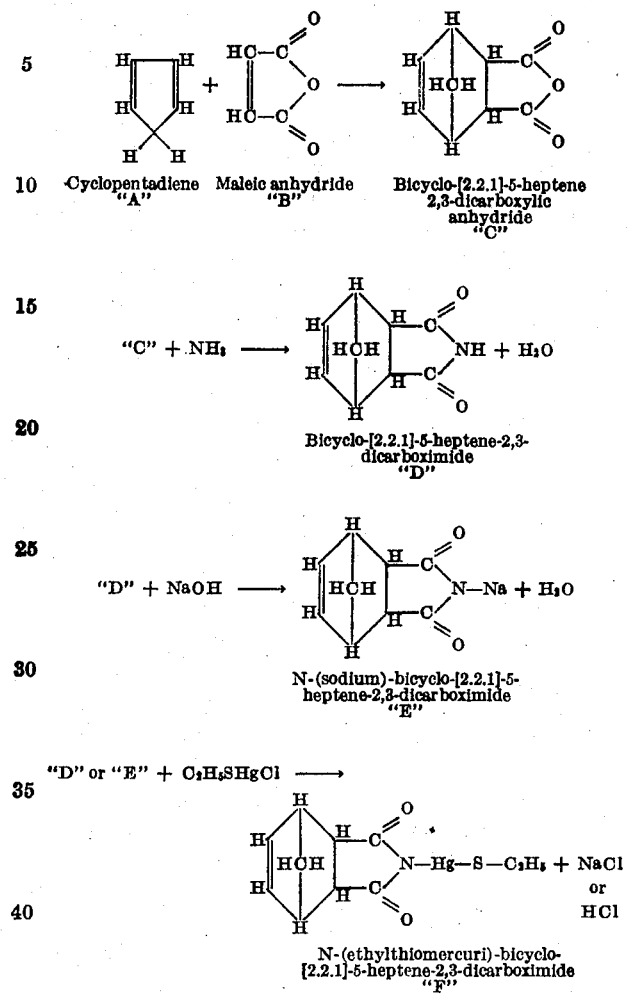

The reaction wherein furan is substituted for cyclopentadiene would modify the above equations only in that the bridged methylene group in compounds "C," "D," and "F" would then be an oxygen bridge. This bridged portion of the molecule does not take part in the reactions.

The compounds analogous to "C," "D," "E" and "F" prepared from furan would be named respectively as follows:

7-oxabicyclo - [2.2.1]-5-heptene - 2,3 - dicarboxylic anhydride.
7-oxabicyclo-[2.2.1]-5-heptene-2,3-dicarboximide.
N-(sodium)-7-oxabicyclo-[2.2.1]-5-heptene-2,3-dicarboximide.
N-(ethylthiomercuri)-7-oxabicyclo-[2.2.1]-5-heptene-2,3-dicarboximide.

The reaction wherein hexachlorocyclopentadiene is substituted for cyclopentadiene would modify the above equations only in that the hydrogen atoms in positions 1, 4, 5, 6 and 7 would then be chlorine atoms. Neither these hydrogen atoms nor the chlorine atoms take part in the reactions.

The compounds analogous to "C," "D," "E" and "F" prepared from hexachlorocyclopentadiene would be named respectively as follows:

1,4,5,6,7,7-hexachloro-bicyclo-[2.2.1]-5 - heptene - 2,3,- dicarboxylic anhydride;

1,4,5,6,7,7-hexachloro-bicyclo-[2.2.1]-5-heptene-2,3 - dicarboximide;

N-(sodium)-1,4,5,6,7,7-hexachloro-bicyclo - [2.2.1] - 5-heptene-2,3-dicarboximide;

N-(ethylthiomercuri) - 1,4,5,6,7,7 - hexachloro - bicyclo-[2.2.1]-5-heptene-2,3-dicarboximide.

As an alternative to the methods above described, maleic acid may be substituted for maleic anhydride as the dienophilic reactant, and the resulting adduct can then be utilized in the present process. Another alternative is the use of maleimide in place of maleic anhydride. This eliminates the conversion of the adduct-anhydride to its corresponding imide in the present process.

According to one method, maleic anhydride can be reacted with cyclopentadiene, hexachlorocyclopentadiene or furan at temperatures between about −25° C. and about 170° C. for from about 10 minutes to about 10 hours, depending upon the temperature employed. A preferred temperature range for this reaction is between about 25° C. and about 85° C. The reaction, utilizing any of these cyclic, dienic reactants, is exothermic, and the rate of addition of these reactants and the rate of heating or cooling should be so controlled as to maintain the reaction temperature within the range desired. The reaction time may be in excess of one hour but unduly extended reaction periods at elevated temperatures are undesirable since side reactions or decomposition may occur. The reaction is preferably carried out in the absence of solvent; however, solvents may be used if desired. Xylene, toluene or benzene are among the preferred solvents. Paraffinic solvents, ethers, and, in general, any relatively inert solvent may also be used. Since the reaction is one of addition, equal molar quantities of reactants are preferred. An excess of either reactant will not prevent reaction but is only uneconomical. If a solvent is used, it can be removed from the product by distillation, or else the product may be crystallized by cooling, and removed by filtration. The product can then be purified, if desired, prior to subjecting it to the next step in the process. This can be accomplished by recrystallization from a hydrocarbon solvent such as benzene or heptane or the like.

In accordance with the nonfully-equivalent alternative wherein maleic acid is used as a starting material instead of maleic anhydride, maleic acid is adducted with any of the aforesaid cyclic dienes in a similar manner as is maleic anhydride. The acid product is then treated in the same manner as hereinafter described for the anhydride product. Similarly, maleimide may be adducted with any of the aforesaid cyclic dienes in a like manner and the products then treated as indicated in the equation for compound "D."

The imide derivative of compound "C" (or its analogues prepared with furan or hexachlorocyclopentadiene) is prepared by reacting the anhydride with ammonia or with an ammonia producing compound, e. g. an ammonium salt such as ammonium carbonate. Thus, heating the adduct-anhydride with ammonium hydroxide will result in a material which, after evaporation to dryness and heating at temperatures of about 100–250° C. will produce the desired imide. Similarly, the fusion of the adduct-anhydride with ammonium carbonate results in excellent yields of the desired imide. Alternatively, the adduct may simply be heated with anhydrous ammonia in an inert solvent such as a hydrocarbon or an ether, and the water formed in the reaction removed by distillation, to produce the imide.

Methods for preparing organo-thio-mercuri compounds, such as the halides, nitrates, acetates, etc., are known to the art. The halides can be prepared, for example, by reacting the appropriate mercaptan, i. e. alkyl, cycloalkyl, alkenyl, aryl, aralkyl or heterocyclic mercaptans with a mercuric halide such as mercuric chloride or mercuric bromide. In general, the reaction between the appropriate mercuric salt and mercaptan will result in the desired product.

The metal salt of the imide derivative of the adduct of maleic anhydride and either cyclopentadiene, hexachlorocyclopentadiene or furan, may be prepared, if desired, by dissolving the imide in a solvent such as methanol, containing a metal hydroxide. Mixed solvents such as methanol and dioxane may also be used; alternatively the imide may be dissolved in aqueous alkali. To the solution of the imide salt is then added the alkyl, cycloalkyl, alkenyl, aryl, aralkyl, or heterocyclic thio-mercuric-halide, acetate, nitrate or other salt, whereupon the metathetical reaction occurs. It is preferred that a mutual solvent be employed. The reaction is hastened by heating the solution; however, the temperature at which the reaction is carried out in not critical. The final, desired product is obtained by removal of any salt formed if it is insoluble in the reaction medium, and by concentration and cooling of the reaction mixture. In some solvents, such as water, the salt which is formed when the N-metallo-imide is used, is soluble and the product precipitates out. Purification of the product may be effected, if desired, by recrystallization from a solvent such as an alcohol, an ether, or a hydrocarbon, although this is generally not necessary since the technical grade product produced as above is usually of a high degree of purity.

To illustrate the process resulting in the products of the present invention more clearly, a detailed description of the methods thereof is herewith presented. The following Example 1 illustrates the use of cyclopentadiene and maleic anhydride in the present process. To utilize either furan or hexachlorocyclopentadiene in place of cyclopentadiene requires only taking into consideration their difference in molecular weights as compared to cycloptentadiene. Thus, while the weight may vary, the molar ratio of reactants will remain constant. Examples 2 and 3 illustrate the use of hexachlorocyclopentadiene and furan, respectively.

EXAMPLE 1

A. *Preparation of bicyclo-[2.2.1]-5-heptene - 2,3 - dicarboxylic anhydride*

Into a 1-liter, 3-necked flask, equipped with a reflux condenser, dropping funnel and stirrer, containing maleic anhydride (98 g.; 1.0 mole) in benzene (500 ml.) is slowly added below the surface of said solution in a portionwise manner cyclopentadiene (66 g.; 1.0 mole). An exothermic reaction takes place. When the addition is complete, the reaction is allowed to proceed for about 30 additional minutes. Most of the benzene is then removed by vacuum distillation, and the mixture is cooled. The adduct of cyclopentadiene and maleic anhydride readily crystallizes. The yield is almost quantitative. The adduct may be purified by recrystallization from hexane.

B. *Preparation of bicyclo-[2.2.1]-5-heptene - 2,3 - dicarboximide*

The anhydride prepared in part A (16.4 g.; 0.1 mole) is mixed with ammonium carbonate monohydrate (11.4 g.; 0.1 mole) in a covered beaker and heated to fusion with stirring. The fused mixture is cooled and dissolved in boiling xylene. The xylene solution is filtered and concentrated until crystallization results on cooling. The crystallized product is filtered and dried.

C. *Preparation of ethyl thio-mercuric acetate*

The preparation of organo-thio-mercuric compounds such as alkyl, cycloalkyl, alkenyl, aryl, aralkyl, and heterocyclic thio-mercuric compounds is known in the art. For example, reference to ethylthio-mercuric acetate which is used in the present example can be found in J. anorg. allgem. Chem. 135, 273–82 (1924).

D. *Preparation of N - (potassium) - bicyclo-[2.2.1]-5-heptene -2,3-dicarboximide*

Potassium hydroxide (5.8 g.; 0.1 mole) is dissolved in absolute methanol (75 ml.) at room temperature, and the resulting solution is added to a boiling solution of bicyclo-[2.2.1]-5-heptene-2,3-dicarboximide (16.3 g.; 0.1 mole) in anhydrous dioxane (75 ml.). The resulting solution containing the desired potassium salt is cooled to normal room temperature.

E. *Preparation of N-(ethylthiomercuri)-bicyclo-[2.2.1]-5-heptene-2,3-dicarboximide*

Ethylthiomercuric acetate (32.2 g.; 0.1 mole) is placed in isopropanol (250 ml.) and heated to near boiling temperature. To this mixture, while hot, is added the solution of the N-potassium imide as prepared in part "D" above. This resulting mixture is kept warm for about 2½ hours. It is concentrated to about 100 ml. by evaporation, and the solution is poured into 300 ml. cold water. The precipitate which forms is collected by filtration and after drying is then dissolved in boiling heptane (about 650 ml.). This volume is reduced by evaporation and the solution is then cooled to about −10° C. The desired product crystallizes and is isolated from the liquid by filtration. It can be purified by recrystallization from a 4:1 mixture of heptane and benzene.

EXAMPLE 2

A. *Preparation of 1,4,5,6,7,7-hexachloro-bicyclo-[2.2.1]-5-heptene-2,3-dicarboxylic anhydride*

A solution of 6 moles hexachlorocyclopentadiene, 6 moles maleic anhydride and 75 ml. xylene is placed in a 3-necked, 3-liter flask equipped with a mechanical stirrer and thermometer. The stirrer is started and the mixture is slowly heated until a temperature of 145° C. is attained. Heating is discontinued and the temperature continues to rise spontaneously to 170° C. After the reaction rate subsides, heat is reapplied to maintain the temperature at 160–170° C. for one additional hour. Heating is then discontinued, and when the temperature drops to about 140° C., 75 ml. additional xylene is added; then when the temperature drops to about 120° C., one liter of heptane is slowly added with stirring. The reaction mixture is transferred to a 3-liter beaker, stirred well, and allowed to cool to room temperature. The crystalline product is removed by filtration, washed, with hexane, and dried under vacuum.

B. *Preparation of 1,4,5,6,7,7-hexachloro-bicyclo-[2.2.1]-5-heptene-2,3-dicarboximide*

The product of A, above, (0.1 mole-37.1 g.) is mixed with ammonium carbonate monohydrate (0.1 mole-11.4 g.) in a covered beaker and heated to fusion with stirring. The fused mixture is cooled and dissolved in 400 ml. of boiling xylene. Carbonaceous matter is filtered off and the solution is concentrated to 200 ml. Crystallization results readily on cooling. The product is filtered and dried at 110° C.

C. *Preparation of N-(potassium)-1,4,5,6,7,7-hexachloro-bicyclo-[2.2.1]-5-heptene-2,3-dicarboximide*

Potassium hydroxide (0.1 mole; 5.8 g.) is dissolved in absolute methanol (75 ml.) at room temperature, and the resulting solution is added to a boiling solution of 1,4,5,6,7,7 - hexachloro - bicyclo - [2.2.1]-5-heptene - 2,3-dicarboximide (0.1 mole; 37.1 g.) in anhydrous dioxane (75 ml.). The resulting solution, which contains the desired potassium salt of the imide, is cooled to room temperature.

D. *Preparation of N-(ethylthiomercuri)-1,4,5,6,7,7-hexachloro-bicyclo-[2.2.1]-5-heptene-2,3-dicarboximide*

Ethylthiomercuric acetate (32.2 g.; 0.1 mole) is placed in isopropanol (250 ml.) and heated to near boiling temperature. To this mixture, while hot, is added the solution of the N-potassium imide as prepared in part C above. This resulting mixture is kept warm for about 2½ hours. It is then concentrated to about 100 ml. by evaporation and the solution is poured into 300 ml. cold water. The precipitate which forms is collected by filtration and after drying is then dissolved in boiling heptane (about 650 ml.). This volume is reduced by evaporation and the solution is then cooled to about −10° C. The desired product crystallizes and is isolated from the liquid by filtration. It can be purified by recrystallization from a 4:1 mixture of heptane and benzene.

EXAMPLE 3

This example also illustrates the use of maleimide as a starting material in the present process.

A. *Preparation of 7 - oxabicyclo - [2.2.1] - 5 - heptene - 2,3-dicarboximide*

Maleimide (9.7 g.; 0.1 mole) is placed in a 3-necked flask equipped with a reflux condenser, dropping funnel and stirrer, and containing diethyl ether (100 ml.). Furan (6.8 g.; 0.1 mole) is slowly added to the flask below the surface of the mixture and in a portionwise manner with stirring. An exothermic reaction takes place. When the addition is complete, the reaction is allowed to proceed for about 30 additional minutes. The desired product crystallizes and is isolated by filtration. While its purity is usually satisfactory it may be further purified by recrystallization from hexane.

B. *Preparation of - N - (potassium) - 7 - oxabicyclo - [2.2.1]-5-heptene-2,3-dicarboximide*

Potassium hydroxide (5.8 g.; 0.1 mole) is dissolved in absolute methanol (75 ml.) at room temperature, and the resulting solution is added to a solution of 7-oxabicyclo-[2.2.1]-5-heptene-2,3-dicarboximide (16.5 g.; 0.1 mole) in anhydrous dioxane (75 ml.). The resulting solution contains the desired potassium salt.

C. *Preparation of N - (ethylthiomercuri) - 7 - oxabicyclo-[2.2.1]-5-heptene-2,3-dicarboximide*

Ethylthiomercuric acetate (32.2 g.; 0.1 mole) is placed in isopropanol (250 ml.) and heated to near boiling temperature. To this mixture, while hot, is added the solution of the N.-potassium imide as prepared in part B above. This resulting mixture is kept warm for about 2½ hours. It is concentrated to about 100 ml. by evaporation, and the solution is poured into 300 ml. cold water. The precipitate which forms is collected by filtration and, after drying, is then dissolved in boiling heptane (about 650 ml.). This volume is reduced by evaporation and the solution is then cooled to about −10° C. The desired product crystallizes and is isolated from the liquid by filtration. It can be purified by recrystallization from a 4:1 mixture of heptane and benzene.

It will be noted that other alkyl, cycloalkyl, alkenyl, aryl, aralkyl or heterocyclic substituents may be substituted for the ethyl group of the specific examples merely by starting with the desired thio-mercury derivative thereof and reacting it as described for ethylthiomercuric acetate. Substituents which can be substituted for the ethyl group of the products of the specific examples are, for example, alkyl groups such as methyl, beta-chloroethyl, propyl, beta-hydroxyethyl, hexyl, dodecyl, isobutyl, n-amyl n-heptyl, tert-amyl, cetyl, n-octyl, tetradecyl, hexadecyl, octadecyl; alkenyl groups such as allyl, methallyl, propenyl, beta-chloroallyl, hexenyl, hexadecenyl, butenyl; cycloalkyl groups such as cyclohexyl, aminocyclohexyl, cyclopentyl, cyclopropyl, chlorocyclohexyl, bornyl; aryl groups such as phenyl, p-bromophenyl, 4'-methoxybiphenyl, biphenyl, naphthyl, anthryl, acenaphthyl, phenoxyphenyl; aralkyl groups such as benzyl, p-aminobenzyl, phenethyl, phenylpropyl, phenylbutyl, p-fluorobenzyl, mesitylyl, cumenyl; and heterocyclic groups such as dibenzofuryl, furyl, pyrryl, pyridyl, piperidyl, quinolyl, thienyl, 5-methoxy-thienyl, 3-chlorothienyl, pyranyl, oxazolyl, thiazolyl, thiazolinyl, thiapyranyl, acridyl, etc. In general, any organic radical containing up to 22 carbon atoms can be substituted.

While an organo-thio-mercuric-acetate has been mentioned in the specific examples, the organo-thio-mercuric-halides such as the chloride, bromide and iodide will react substantially equivalently. Similarly, substantial equivalents in the present process are organo-thio-mercuric nitrates, etc. In any event, the "R" in the formula shown in column 1 is identical with the organic portion of the organo-thio-mercuri compound utilized.

Although the potassium salt of the imide is shown in the specific examples, other alkali metal salts are equally suitable, as are even the salts of other nonpreferred metals such as those of the alkaline earth group. It is not necessary, moreover, to utilize the salt of the imide as illustrated in the examples; the imide itself may be used directly in a mutual solvent with the thio-mercuric compound.

The compounds of the present invention are useful as pesticides and in particular are potent fungicides and may be utilized and applied as a sole, active ingredient dispersed in carriers such as dusts, solvents, aqueous dispersions or other carriers frequently used in the art. In addition, the compounds of the present invention can be used in combination with other insecticides or fungicides.

I claim as my invention:

1. As a new composition of matter a compound having the formula

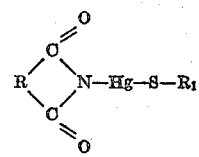

wherein R is a radical selected from the group consisting of

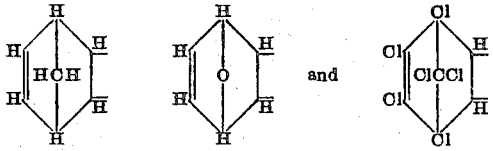

and $R_1$ is the ethyl radical.

2. N - (ethylthiomercuri) - bicyclo - [2.2.1] - 5 - heptene-2,3-dicarboximide.

3. N - (ethylthiomercuri) - 1,4,5,6,7,7 - hexachloro - bicyclo-[2.2.1]-5-heptene-2,3-dicarboximide.

4. N - (ethylthiomercuri) - 7 - oxabicyclo - [2.2.1] - 5-heptene-2,3-dicarboximide.

No references cited.